United States Patent [19]

Nishida et al.

[11] Patent Number: 4,727,849
[45] Date of Patent: Mar. 1, 1988

[54] EXHAUST GAS RECIRCULATION CONTROL SYSTEM FOR AN INTERNAL COMBUSTION ENGINE

[75] Inventors: Minoru Nishida; Noriyuki Inoue, both of Amagasaki, Japan

[73] Assignee: Mitsubishi Denki Kabushiki Kaisha, Tokyo, Japan

[21] Appl. No.: 41,422

[22] Filed: Apr. 23, 1987

[30] Foreign Application Priority Data

Apr. 24, 1986 [JP] Japan ................................. 51-95608
Aug. 6, 1986 [JP] Japan ................................. 51-185735

[51] Int. Cl.$^4$ ........................................... F02M 25/06
[52] U.S. Cl. .................................................... 123/571
[58] Field of Search .............. 123/440, 489, 568, 569, 123/571, 589; 60/276, 278, 285

[56] References Cited

U.S. PATENT DOCUMENTS

| | | | |
|---|---|---|---|
| 4,005,689 | 2/1977 | Barnard | 60/276 X |
| 4,108,122 | 8/1978 | Barnard | 60/276 X |
| 4,168,683 | 9/1979 | Hata et al. | 123/571 |
| 4,185,604 | 1/1980 | Hatsuo et al. | 123/571 |
| 4,385,616 | 5/1983 | Kobayashi et al. | 123/571 |
| 4,471,745 | 9/1984 | Yoshioka et al. | 123/571 |
| 4,614,175 | 9/1986 | Asayama | 123/571 |

*Primary Examiner*—Willis R. Wolfe
*Attorney, Agent, or Firm*—Oblon, Fisher, Spivak, McClelland & Maier

[57] ABSTRACT

An exhaust gas recirculation control system for an internal combustion engine comprises an exhaust gas recirculation control valve for controlling a recirculation rate for exhaust gas to be mixed with intake air which is supplied to the internal combustion engine, an oxygen sensor disposed in an intake air passage downstream of the control valve to detect the concentration of oxygen in the intake air, a control means which compares the oxygen concentration detected by the oxygen sensor with a desired oxygen concentration previously determined depending on operational conditions of the engine and controls the degree of opening of the exhaust gas recirculation control valve so as to cancel the deviation between the detected oxygen concentration and the desired oxygen concentration, a detecting means for detecting the exhaust gas recirculation rate being zero to supply a signal to the control means on the basis of the detection, and a correcting means for correcting the corresponding relation between the output of the oxygen sensor and the detected oxygen concentration on the basis of the output of the oxygen sensor when the exhaust gas recirculation rate is zero.

5 Claims, 9 Drawing Figures

1

EXHAUST GAS RECIRCULATION CONTROL SYSTEM FOR AN INTERNAL COMBUSTION ENGINE

BACKGROUND OF THE INVENTION

1. Field of the invention

The present invention relates to an exhaust gas recirculation control system for an internal combustion engine for controlling recirculation of exhaust gas.

2. Discussion of Background

There has been known that a part of the exhaust gas of an internal combustion engine is mixed with intake air for the engine, which is called recirculation of the exhaust gas, to reduce $NO_x$ as noxious components in the exhaust gas. In this case, an exhaust gas recirculation (hereinbelow, referred to as an EGR) rate has to be accurately controlled depending on operational conditions of the engine since the EGR rate influences performance of the engine, a fuel consumption rate, etc.

FIG. 7 is a diagram showing a conventional exhaust gas recirculation control apparatus disclosed, for instance, in Japanese Unexamined Patent Publication No. 93950/1980. In FIG. 6, a reference numeral 1 designates an engine block, a numeral 2 an intake manifold, a numeral 3 an exhaust manifold, a numeral 4 a fuel supply device disposed in the intake manifold 2, a numeral 5 a throttle valve, a numeral 6 an intake duct, a numeral 7 an air cleaner, a numeral 8 an engine speed detector, a numeral 9 a negative pressure introducing passage, a numeral 10 an intake air pressure detector for detecting a pressure in the intake manifold 2 through the negative pressure introducing passage 9, a numeral 11 an EGR passage communicating the exhaust manifold 3 with the intake manifold 2, numeral 12 an EGR controlling valve which is operated by a pressure-operable diaphragm, a numeral 13 an aperture detector of or the EGR control valve 12 for detecting the degree of opening of the control valve 12, a numeral 14 an EGR control circuit, a numeral 15 an atmospheric pressure introducing passage, and numeral 16 a controlled negative pressure producing device which receives a signal outputted from the EGR control circuit 14 to control the degree of opening of the EGR control valve 12 taking account of a negative pressure in the negative pressure introducing passage and the atmospheric pressure.

In the EGR control system having the construction as above-mentioned, the speed of the engine and the negative pressure, which indicate the operating conditions of the engine, are respectively detected by the engine speed detector 8 and the intake air pressure detector 10, and signals corresponding to the detected physical quantities are inputted in the EGR control circuit. A desired value (a desired aperture) for opening the EGR control valve 12, which is given by the operational conditions of the engine, is previously inputted in the EGR control circuit 14. The EGR control circuit 14 is adapted to compare a value for the desired aperture with a value indicating an acutually measured aperture which is inputted through the aperture detector 13, and transmits an output signal to the controlled negative pressure producing device 16 so that a comparison deviation (i.e. a deviation obtained by comparing the desired aperture) with the measured aperture is made zero. Namely, a negative pressure from the controlled negative pressure producing device 16 is adjusted on the basis of the output signal from the EGR control circuit 14, the negative pressure of the intake air and the atmospheric pressure, with the result that the degree of opening of the EGR control valve 12 is controlled, whereby the EGR rate is determined so as to make the deviation between the desired aperture and the measured aperture zero. In short, an EGR rate which is in conformity with the operation of the engine is obtained by feeding-back the aperture of the EGR control valve 12 to the EGR control circuit 14 through the output signal of the aperture detector 13.

In the conventional EGR control system, however, when the EGR control valve 12 is used for a long time, fine particles such as carbon particles contained in the exhaust gas deposit on the valve, whereby the EGR rate originally set to correspond to the movement of the aperture of the EGR control valve 12 changes to thereby reduce accuracy in control.

SUMMARY OF THE INVENTION

It is an object of the present invention to provide an exhaust gas recirculation control system for a internal combustion engine which permits highly accurate recirculation control without secular change.

The foregoing and the other objects of the present invention have been attained by providing an exhaust gas recirculation control system for an internal combustion engine which comprises an exhaust gas recirculation control valve for controlling a recirculation rate for exhaust gas to be mixed with intake air which is supplied to the internal combustion engine, an oxygen sensor disposed in an intake air passage downstream of the control valve to detect the concentration of oxygen in the intake air, a control means which compares the oxygen concentration detected by the oxygen sensor with a desired oxygen concentration previously determined depending on the operational condition of the engine and controls the degree of opening of the exhaust gas recirculation control valve so as to cancel the deviation between the detected oxygen concentration and the desired oxygen concentration, a detecting means for detecting the exhaust gas recirculation rate being zero to supply a signal to the control means on the basis of the detection, and a correcting means for correcting the corresponding relation between the output of the oxygen sensor and the detected oxygen concentration on the basis of the output of the oxygen sensor when the exhaust gas recirculation rate is zero.

BREIF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
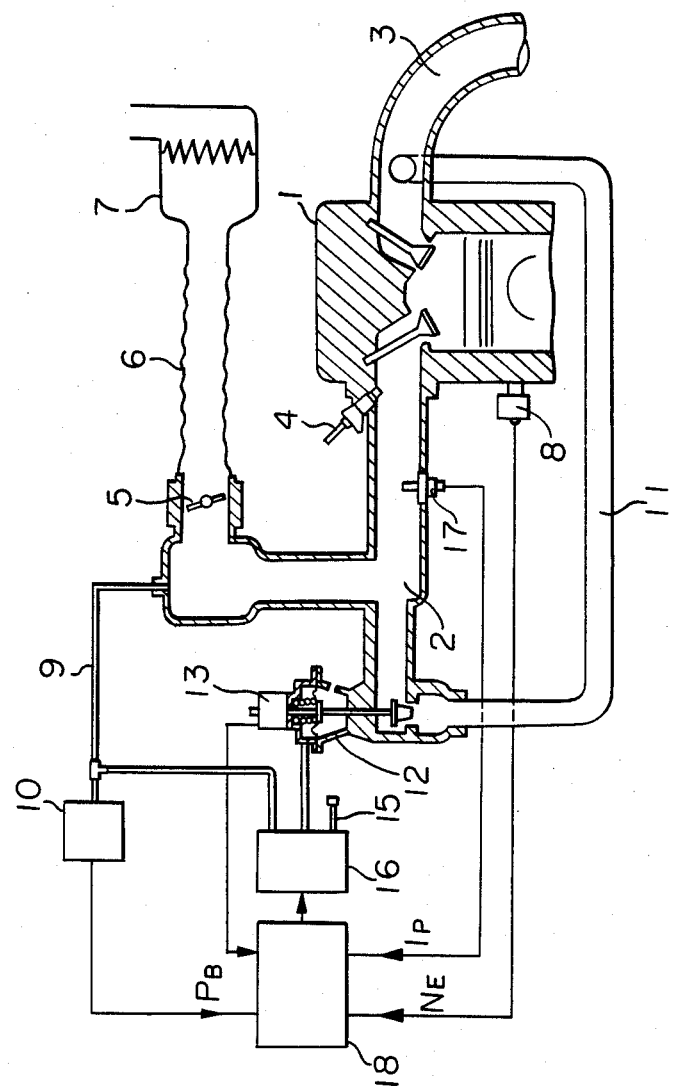
FIG. 1 is a diagram showing an embodiment of the exhaust gas recirculation control system for an internal combustion engine according to the present invention.

Referring to the drawings, wherein the same reference numerals designate the same or corresponding parts throughout the several views, and more particularly to FIG. 1 thereof, there is shown a diagram of the EGR control system according to an embodiment of the present invention. In FIG. 1, a reference numeral 17 designates an oxygen sensor attached to the intake manifold 2 at a position downstream of the opening of the EGR passage 11 on the air intake openingside with respect to the engine block 1, the sensing element projecting into the intake manifold 2. The oxygen sensor 17 is such a sensor of solid-electrolyte oxygen pump type, in which an current output (mA) in proportional to the concentration of oxygen is produced, as proposed, for instance, in Japanese Unexamined Patent Publication No. 153155/1983.

Figure 2:
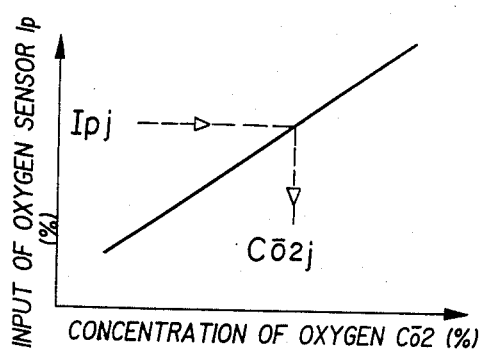
FIG. 2 is a characteristic diagram showing a relation of an output Ip generated from an oxygen sensor used for the EGR control system to a detected concentration of oxygen Co2.
Figure 3:
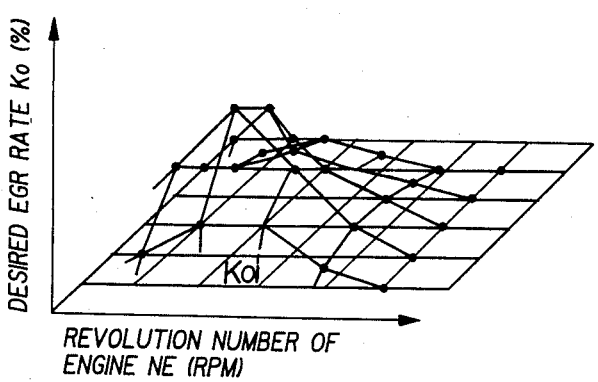
FIG. 3 is a characteristic diagram showing a desired EGR rate Ko which corresponds to the speed (revolution number) NE of the engine and a pressure to suck intake air PB which are inputted to the EGR control circuit of the control system.
Figure 4:
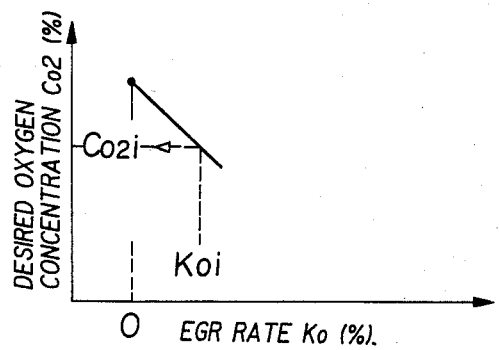
FIG. 4 is a characteristic diagram showing a relation of the desired EGR rate Ko to desired concentration of oxygen Co 2.

FIG. 2 is a characteristic diagram showing a relation of an output Ip from the oxygen sensor 17 to the concentration of oxygen $\bar{Co}2$. The output Ip of the oxygen sensor 17 is inputted in the EGR control circuit 18, where the concentration of oxygen corresponding to the output Ip is obtained by calculation. The EGR control circuit 18 is adapted to store a desired EGR rate Ko (%) which is determined by the engine speed NE (rpm) inputted through the speed number detector 8 and a pressure for intake air PB (mmHg) inputted through the intake air pressure detector 10 (FIG. 3). A desired concentration of oxygen Co 2 is obtained from the desired EGR rate Ko in accordance with the characteristic diagram as shown in FIG. 4. The EGR control circuit 18 compares the desired concentration of oxygen Co 2 determined depending on the operational conditions of the engine with the detected concentration of oxygen $\bar{Co}2$ depending on the output Ip from the oxygen sensor 17, and generates an output signal to the controlled negative pressure producing device 16 so as to make the deviation between the desired concentration of oxygen Co 2 and the detected concentration of oxygen $\bar{Co}2$ to be reduced to zero, whereby the aperture of the EGR control valve 12 is controlled.

Figure 5:
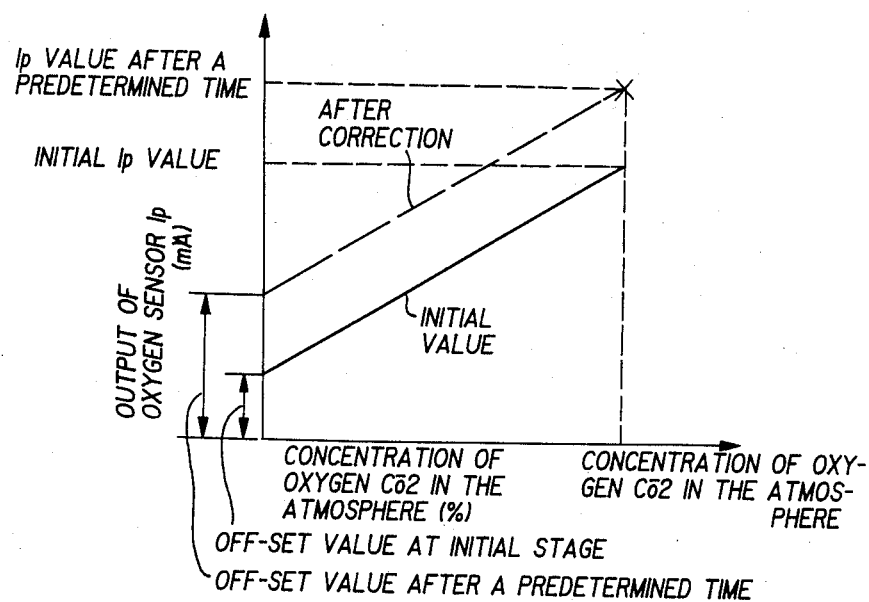
FIGS. 5a and 5b are respectively diagrams each showing a relation of an output Ip from the oxygen sensor to the detected concentration of oxygen $\bar{Co}2$ at the initial stage and after correction.
FIG. 5c is a flow chart showing correction of the corresponding relation between the output of the oxygen sensor and the detected oxygen concentration.
Figure 5:
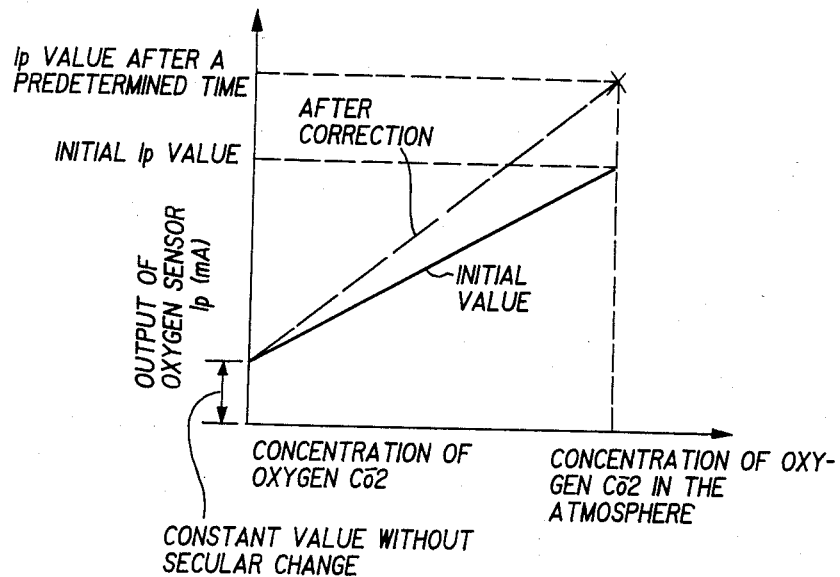
Figure 5:
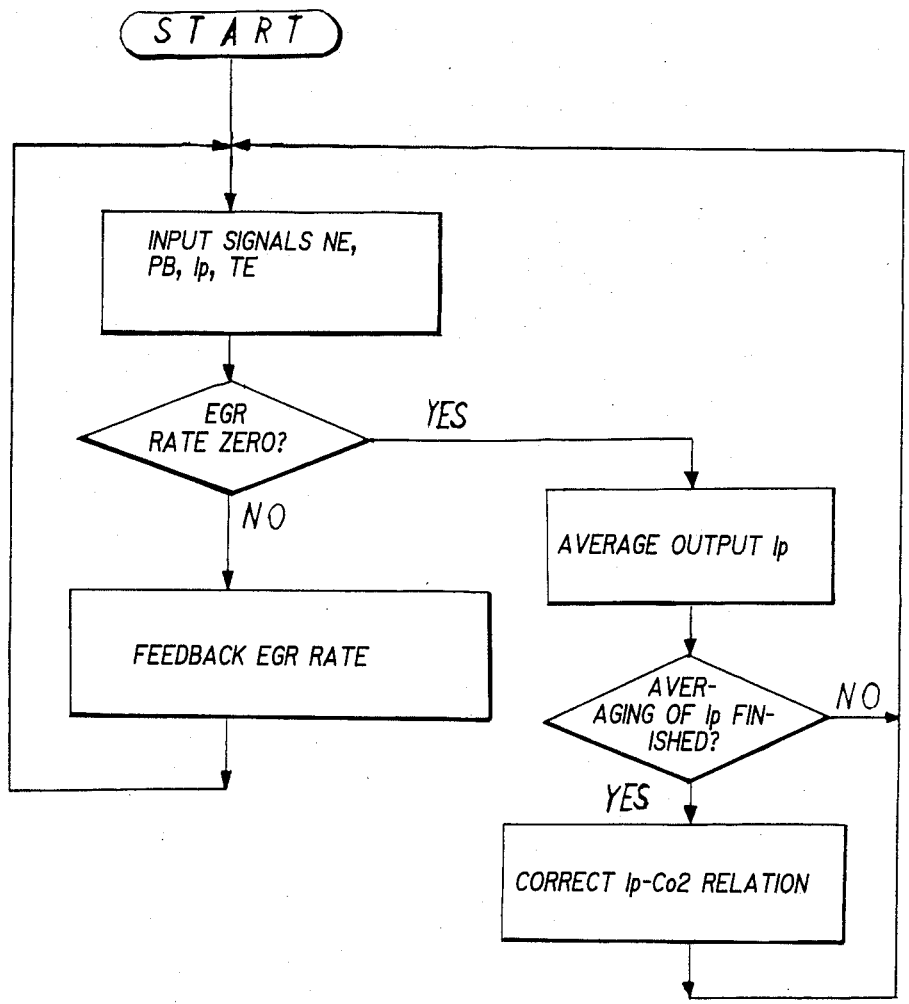

When the entirely closed condition of the EGR control valve 12 is detected by the signal inputted in the EGR control circuit 18 through the aperture detector 13, the detected oxygen concentration $\bar{Co}2$ is compared with a standard oxygen concentration Co20 which is considered as the concentration of oxygen in the atmosphere after the lapse of a predetermined time, and Ip-$\bar{Co}2$ characteristics as shown in FIG. 2 is corrected on the basis of the comparison as above-mentioned. Namely, a corresponding relation between the output of the oxygen sensor 17 and the detected concentration of oxygen $\bar{Co}2$ is corrected so that the detected oxygen concentration $\bar{Co}2$ at the time of the entirely closed condition of the EGR control valve 12 is coincidence with the standard oxygen concentration Co20 of the atmosphere. As an concrete example of the correction, only off-set value may be changed as shown in FIG. 5a when the output Ip is in an off-set proportional relation to the detected oxygen concentration $\bar{Co}2$. Alternatively, correction may be made to change a constant of proportion so as to maintain the output Ip of the sensor to be constant when the detected oxygen concentration $\bar{Co}2$ is zero (FIG. 5b).

The operation of the EGR control system having the construction as above-mentioned will be described. On actuating the engine 1, the singnals the engine speed NE and the pressure PB of the intake air, which show the operational conditions of the engine, are respectively inputted in the EGR control circuit 18 through the engine speed detector 8 and the intake air pressure detector 10. The EGR control circuit 18 selects a aimed EGR rate Koi, for instance, among the desired EGR rates Ko previously stored depending on the engine speed NE and the intake air pressure PB (FIG. 3). The EGR control circuit 18 reads out a desired oxygen concentration Co 2i on the basis of the aimed EGR rate Koi thus selected, according to the characteristic line shown in FIG. 4.

On the other hand, the concentration of oxygen in an exhaust-gas-containing air in the intake manifold 2 is calculated from by the output Ip from the oxygen sensor 17 as shown in FIG. 2. And, thus calculated oxygen concentration $\bar{Co}2j$ is compared with the desired oxygen concentration Co 2i read out as mentioned above. Then, an output signal is supplied to the controlled negative pressure producing device 16 to make the compared deviation to be zero. The controlled negative pressure producing device 16 generates a negative pressure which is regulated by using the pressures in the negative pressure introducing passage 9 and the atmospheric pressure introducing passage 15 so that the aperture of the EGR control valve 12 is controlled. As a result, the detected oxygen concentration is brought closer to the desired oxygen concentration. In this case, when the EGR control valve 12 is moved toward the opening direction, the EGR rate increases, whereby the oxygen concentration $\bar{Co}2j$ corresponding to the output Ip of the oxygen sensor 17 decreases. On the other hand, when the control valve 12 is moved in the closing direction, the oxygen concentration $\bar{Co}2j$ increases.

Thus, according to the present invention, the aperture of the EGR control valve 12 is controlled depending on an oxygen concentration in the intake air to obtain a desired EGR rate depending on the operatinal conditions. Accordingly, the initially set EGR control characteristics can not be impaired even though a large amount of fine particles such as carbon particles contained in the exhaust gas deposit on the control valve 12 during a long term use of it.

In the foregoing, description has been made as to the controlling operation of the EGR control valve 12. However, a distinctive operation of the EGR control system including the EGR control circuit 18 of the present invention is carried out when the EGR control valve 12 is in a closed state, i.e. the EGR rate becomes zero. For instance, when the engine 1 is in idling operation, the desired EGR rate is Ko=0, namely, the EGR control valve 12 is in the entirely closed state. Namely, when the EGR control valve 12 is in the entirely closed state, the oxygen concentration of the intake air detected by the oxygen sensor 17 is equal to the oxygen concentration in the atmosphere. The entirely closing state of the control valve 12 is detected by the EGR control circuit 18 through the output signal of the aperture detector 13; Thereafter, the detected oxygen concentration $\overline{Co2}$ is compared with the standard oxygen concentration Co20 after a predetermined time from the detection so that the corresponding relation between the output Ip of the oxygen sensor 17 and the detected oxygen concentration $\overline{Co2}$ is corrected to coincide $\overline{Co2}$ with Co20. FIG. 5c is a flow chart showing an example how correction of Tp-Co 2 relation is done. Thus, by correcting the corresponding relation between the oxygen concentration Co 2 and the standard oxygen concentration Co20 so that they are coincide with each other, there is obtainable flexibility on the oxygen sensor to be used in the control system of the present invention even though there is some difference in characteristics of the oxygen sensor. Further, it is possible to correct the secular change which may be electro-chemically caused in the oxygen sensor.

In the above-mentioned embodiments, the aperture detector 13 is used as means for detecting the entirely closed state of the EGR control valve 12. However, it is possible to use a device having the similar function, such as a position switch wherein the entirely closed state of the EGR control valve 12 is mechanically detected and a physical position thus detected is converted into an electric signal.

For the EGR control valve 12 operable by a negative pressure through a diaphragm member, a stepping motor or a combination of a d.c. motor and gears may be employed. In this case, means for detecting the entirely closed state of the control valve 12 may be a current detector for detecting the fact that a current to be supplied to the motor reaches a predetermined value; a counter for counting voltage (or current) pulses to be applied to the stepping motor, or a rotation angle detector.

Figure 6:
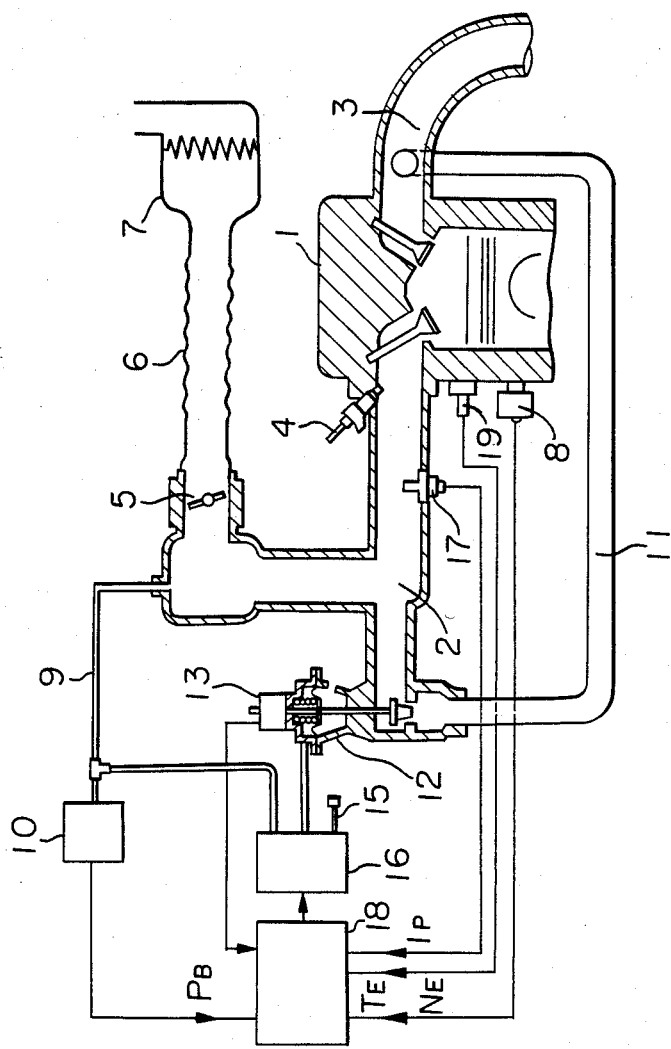
FIG. 6 is a diagram showing another embodiment of the EGR system for an internal combustion engine according to the present invention.
Figure 7:
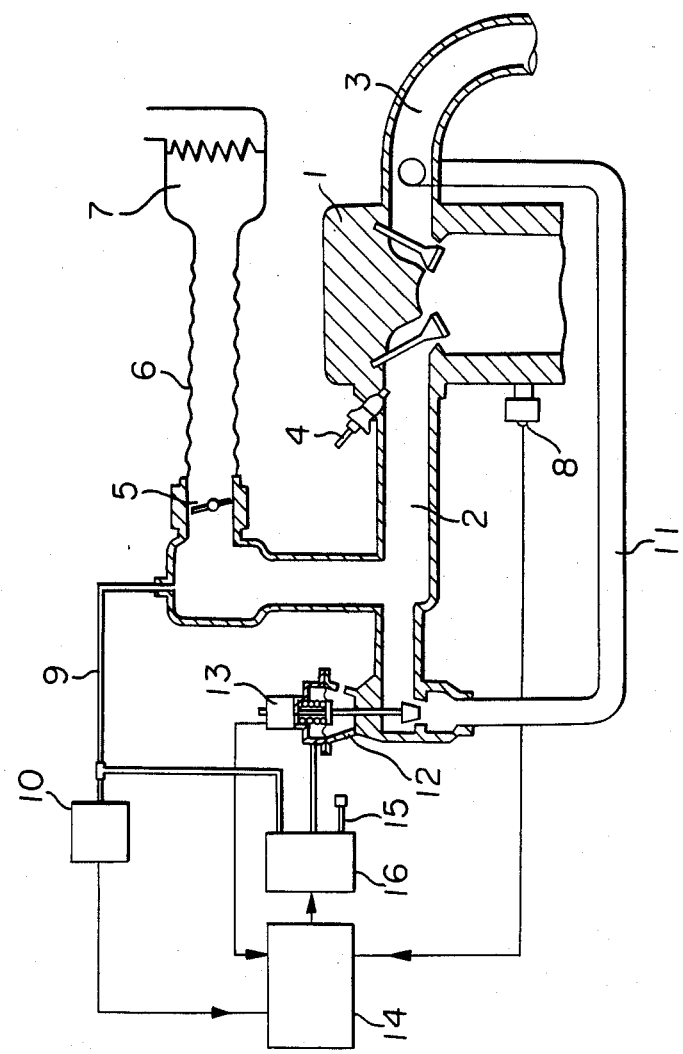
FIG. 7 is a diagram showing a conventional EGR control system.

In the following, a second embodiment of the present invention will be described with reference to FIG. 6. In FIG. 6, the same reference numeral as in FIG. 1 designate the same or corresponding parts, and therefore, description of these parts is omitted.

The EGR control system shown in FIG. 6 performs the same function as shown in FIGS. 2 to 5 as the first embodiment does.

In FIG. 6, a reference numeral 19 designates a temperature sensor attached to the engine block 1 to detect the temperature of cooling water for cooling the engine. The EGR control circuit 18 is adapted to receive signals indicative of the temperature TE of the cooling water detected by the temperature sensor 19 successively as well as signals indicative of the revolution number of the engine from the engine speed detector 8 and the signals from the intake air pressure detector. The EGR circuit 18 detects that the EGR rate reduced to zero by recieving these signals. Namely, the EGR control valve 12 maintains its entirely closed state, that is, the EGR rate is zero, when the water temperatue TE of the cooling water for the engine block 1 is lower than a predetermined temperature after the engine has been started, or when the engine is in an idling operation even when the water temperature is high enough. In other words, the fact that the EGR rate is zero is detected by the EGR control circuit 18 through the signals of the water temperature TE, the engine speed and the pressure of the intake air. Then, the oxygen concentration $\overline{Co2}$ detected after the predetermined time is compare with the standard oxygen concentration Co20 in the atmosphere with the consequence that the Ip-$\overline{Co2}$ characterisitics as shown in FIG. 2 is corrected. Namely, the corresponding relation between the output Ip of the oxygen sensor 17 and the detected oxygen concentration $\overline{Co2}$ is corrected so that the detected oxygen concentration $\overline{Co2}$ at the time of the EGR rate being zero coincide with the standard oxygen concentration Co2o. As a practical application for the correction, it is considered that when the output Ip of the oxygen sensor 17 is in an off-set proportional relation to the detected oxygen concentration $\overline{Co2}$, only the off set value is changed as shown in FIG. 5a, or the output Ip of the oxygen sensor 17 at the time of the detected oxygen concentration $\overline{Co2}$ being zero is kept at a constant value by changing a proportional constant as shown in FIG. 5b.

The operation of the EGR control system of the second embodiment will be described on only different function from that of first embodiment.

When the water temperature TE of the engine is lower than the predetermined temperature after the engine has been started, or when the engine is under idling condition even when the water temperture is high enough, the EGR control valve 12 maintains its entirely closing state, hence, the EGR rate is zero. Accordingly, the fact that the EGR rate is zero is detected in the EGR control circuit 18 through the signals of the water temperature TE from the temperature sensor 19, or the signals from the engine speed detector 8 and the intake air pressure detector 10. After a predetermined time has gone on, the detected oxygen concentration $\overline{Co2}$ at the time of the detection of the EGR rate being zero is compared with the standard oxygen concentration Co20 in the atmosphere, whereby the corresponding relation between the output Ip of the oxygen sensor 17 and the detected oxygen concentration $\overline{Co2}$ is corrected so that the detected oxygen concentration $\overline{Co2}$ is coincidence with the standard oxygen concetration Co20. Namely, when the EGR rate is zero, the oxygen concentration of the intake air detected by the oxygen sensor 17 is equal to the oxygen concentration of the atmosphere. Accordingly, by correcting the corresponding relation of the oxygen concentration so as to coinside the oxygen concentration $\overline{Co2}$ with the standard oxygen concentration Co20, the oxygen sensor can be used for the control system of the present invention with great flexibility regardless of the fact that the oxygen sensor has some difference in characteristics each other. Further, the secular change electro-chemically caused in the oxygen sensor can be improved.

In the above-mentioned embodiment, description has been made as to the EGR control valve 12 operable by a negative pressure through the diaphragm. However, for the EGR control valve 12, a stepping motor or a combination of a d.c. motor and gears may be used.

According to the second embodiment of the present invention, the corresponding relation between the output of the oxygen sensor and the detected oxygen concentration is corrected on the basis of the oxygen concentration detected by the oxygen sensor when the EGR control valve is in the entirely closing state. Accordingly, the EGR rate is controlled by the oxygen concentration in proportion to a mixing rate of the exhaust gas, and a highly accurate recirculation control can be attained without causing the secular change
Further, even though there are some difference in characteristics in the oxygen sensor to be installed in the control system of the present invention, it is possible to correct the corresponding relation between the output of the oxygen sensor and the detected oxygen concentration when the EGR control valve is in the entirely closed state.

Obviously, numerous modifications and variations of the present invention are possible in light of the above teachings. It is therefore to be understood that within the scope of the appended claims, the invention may be practiced otherwise than as specifically described herein.

What is claimed is:

1. An exhaust gas recirculation control system for an internal combustion engine which comprises;
   an exhaust gas recirculation control valve for controlling a recirculation rate for exhaust gas to be mixed with intake air which is supplied to the internal combustion engine,
   an oxygen sensor disposed in an intake air passage downstream of said control valve to detect the concentration of oxygen in the intake air,
   a control means which compares the oxygen concentration detected by said oxygen sensor with a desired oxygen concentration previously determined depending on operational conditions of the engine and controls the degree of opening of said exhaust gas recirculation control valve so as to cancel the deviation between the detected oxygen concentration and the desired oxygen concentration,
   a detecting means for detecting the exhaust gas recirculation rate being zero to supply a signal to said control means on the basis of the detection, and
   a correcting means for correcting the corresponding relation between the output of said oxygen sensor and the detected oxygen concentration on the basis of the output of the oxygen sensor when the exhaust gas recirculation rate is zero.

2. The control system according to claim 1, wherein said desired oxygen concentration to be determined in said control means is calculated on the basis of a desired exhaust gas recirculation rate stored in said control means which is determined in consideration of the revolution number of the engine and the pressure of intake air.

3. The control sytem according to claim 1, wherein said detecting means for producing a signal indicative of the exhaust gas recirculation rate being zero is an aperture detector for detcting the degree of opening of said exhasut gas recirculation control valve.

4. The control system according to claim 1, wherein said detecting means for producing the signal indicative of the exhaust gas recirculation rate being zero is a cooling water temperature sensor, an engine speed detector or an intake air pressure detector.

5. The control system according to claim 1, wherein said control means is adapted to correct the corresponding relation between the detected oxygen concentration and a standard oxygen concentration a predetermined time after the exhaust gas recirculation rate has become zero.

* * * * *